FIP8102 XR 3,842,247

United States Patent

Anderson

[11] 3,842,247

[45] Oct. 15, 1974

[54] APPARATUS AND METHOD FOR MEASURING ENVELOPE DELAY UTILIZING π-POINT TECHNIQUE

[75] Inventor: Theodore Carl Anderson, Middletown, N.J.

[73] Assignee: Bell Telephone Laboratories Incorporated, Murray Hill, N.J.

[22] Filed: Oct. 18, 1972

[21] Appl. No.: 298,478

[52] U.S. Cl. ................ 235/152, 444/1, 324/57 DE, 325/67

[51] Int. Cl. ................ G06f 7/38

[58] Field of Search ........ 444/1; 179/175.3; 324/82, 324/83, 57 DE; 325/67, 363; 235/152

[56] References Cited

UNITED STATES PATENTS

| | | | |
|---|---|---|---|
| 2,618,686 | 11/1952 | DeLange | 324/57 DE |
| 3,407,355 | 10/1968 | Clark et al. | 325/67 |
| 3,629,696 | 12/1971 | Bartelink | 179/175.3 X |
| 3,706,931 | 12/1972 | Subramanian | 325/363 X |
| 3,758,763 | 9/1973 | Nohara et al. | 444/1 X |

*Primary Examiner*—Malcolm A. Morrison
*Assistant Examiner*—James F. Gottman
*Attorney, Agent, or Firm*—Thomas Stafford

[57] ABSTRACT

Phase distortion and envelope delay distortion of an electrically long transmission facility are determined by employing a so-called π-point technique to obtain envelope delay measurements. A test signal is supplied simultaneously to a reference circuit path and to a test circuit path including a facility-under-test. Attenuation is inserted into the reference path equal to the loss experienced by the test signal in the facility-under-test. Output signals from the test and reference paths are algebraically summed. Since the signals have equal amplitudes, nulls occur at frequencies at which the signals are 180° out of phase. The frequency of the test signal is incremented through a predetermined interval and the number of amplitude nulls which occur is counted. The null count and frequency interval are utilized to obtain the desired envelope delay measurements.

23 Claims, 4 Drawing Figures

3842247
OR IN 364/481

APPARATUS AND METHOD FOR MEASURING ENVELOPE DELAY UTILIZING π-POINT TECHNIQUE

BACKGROUND OF THE INVENTION

This invention relates to a system and method for obtaining a measure of envelope delay in communications facilities and, more particularly, to a system and method for obtaining a measure of envelope delay distortion and phase distortion in communications transmission systems.

In order to maintain communications systems properly, for example, telephone transmission facilities and the like, numerous measurements are made of system characteristics. Important among these is the measurement of phase distortion and envelope delay distortion. To this end, what is commonly called envelope delay is measured over the frequency range of the facility being evaluated. Envelope delay is defined as the slope of the phase versus frequency characteristic of the transmission facility. In an ideal communications system, envelope delay is constant over the frequency band. However, in practical systems there are deviations in the envelope delay over the frequency band. These deviations from an arbitrary reference are defined as the envelope delay distortion of the facility. The envelope delay measurements are also utilized to compute the phase distortion of the facility.

Heretofore, envelope delay measurements have been made by employing a carrier frequency signal which is amplitude modulated by a stable "low" frequency reference signal. The carrier frequency and upper and lower sidebands are propagated through the facility being evaluated, thereby experiencing a delay dependent upon their position in the frequency band. These signals are detected at the output of the facility under evaluation. Then, a measure of envelope delay at the carrier frequency is obtained by precisely measuring the delay interval between the detected signals and the low frequency reference signal.

Such prior systems require extremely stable signal generators and extremely precise and complex time interval measurement apparatus.

It is, therefore, a general object of this invention to obtain accurate envelope delay measurements and, hence, an accurate measure of the envelope delay distortion and phase distortion of a transmission facility without the need for complex precision time interval measurement apparatus.

SUMMARY OF THE INVENTION

This and other objects are achieved in accordance with the inventive principles described herein, in a system and method for obtaining envelope delay measurements and, hence, the envelope delay distortion and phase distortion characteristics of a transmission facility by employing an amplitude null count technique.

More specifically, envelope delay of a particular transmission facility is measured by propagating a test signal at a given frequency simultaneously through a reference path having essentially constant phase shift over the frequency range being considered and a test path including the transmission facility-under-test. The loss of the reference path is adjusted to equal the loss experienced in the facility-under-test at the test signal frequency. Outputs from the test path and reference path are algebraically summed. If the signals from the test path and reference path are equal and 180° out of phase, a null occurs. The frequency of the test signal is then stepped by an increment related to the frequency spacing between nulls over a predetermined measurement frequency interval. The summed signal is evaluated to determine the number of nulls which occur during the measurement frequency interval. The number of nulls and the measurement frequency interval are utilized to yield a measure of envelope delay and, hence, the envelope delay distortion and phase distortion of the facility-under-test. This process is repeated for additional measurement frequency intervals over the frequency band of the facility being evaluated.

The above measurements are achieved by employing a controllable signal generator in the circuit associated with both the test and reference paths. The test path is arranged to accomodate circuit connection to the transmission facilities to be evaluated, while the reference path includes a controllable attenuator for inserting predetermined loss values therein. Outputs from the test path and reference path are supplied to separate inputs of a summing network. The output of the summing network is supplied to a controllable level detector for measuring the summed signal level to determine null points. In turn, the level detector output is supplied to a general purpose computer. The computer is preprogrammed in accordance with the invention to control the signal generator, attenuator and level detector for effecting envelope delay measurements.

It is known that the rate of change of envelope delay is generally not large. Thus, it follows that each null in a measurement frequency interval need not be individually detected, and several nulls may be counted during each cycle of the computer program measurement procedure. To this end, several successive nulls are accurately detected to obtain an "updated" value for frequency spacing between nulls.

Instructions are included in the computer program to increment, in accordance with the invention, the frequency of the signal generator by an interval equal to a number of nulls to be "skipped" multiplied by the updated frequency spacing between nulls over a particular frequency interval of interest. Thus, the need for detecting each individual null is alleviated. Thereafter, the incremental frequency interval, i.e., spacing between nulls, is updated for each subsequent measurement frequency interval at the termination of each previous measurement frequency interval over the frequency band for the facility-under-test. That is to say, the incremental frequency between nulls is recomputed for each subsequent measurement interval from the data obtained during the previous measurement intervals. This ensures accuracy of the null count when the "skipping" routine is being employed. Such a routine reduces substantially the time required to measure envelope delay over the entire frequency band of a facility-under-test without compromising measurement accuracy.

BRIEF DESCRIPTION OF THE DRAWINGS

These and other objects and advantages of the invention will be more fully understood from the following detailed description of an illustrative embodiment thereof taken in connection with the attendant drawings in which.

DETAILED DESCRIPTION

The phase characteristic of an electrically long transmission facility, for example, a coaxial cable, or the like, typically is monotonic increasing with frequency. Furthermore, the slope of the phase versus frequency characteristic of such a facility is large. Therefore, there are phase shifts in the order of large multiples of $2\pi$, for example, $N2\pi$, over relatively small frequency intervals as compared to the frequency band of the transmission facility. The phase characteristic slope is defined as the envelope delay of the facility and is expressed as $$\tau = \Delta\phi/\Delta\omega = 2\pi N/2\pi\Delta F = N/\Delta F \quad (1)$$

where $\tau$ is envelope delay, and $\Delta\phi$ is the change in phase over frequency interval $\Delta\omega$ and $\omega = 2\pi F$.

Figure 1:
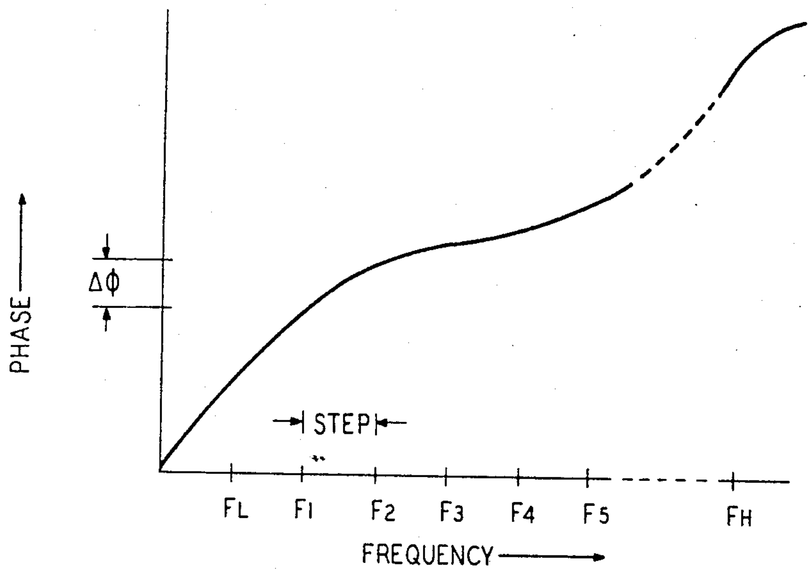
FIG. 1 shows a graph of phase versus frequency for a facility-under-test.

FIG. 1 illustrates a possible phase versus frequency characteristic for an electrically long transmission facility. Typically, envelope delay is measured at numerous frequency points over the frequency band of the transmission facility. For example, at frequency intervals STEP from *FL* through *FH*, where $\Delta\omega = 2\pi$STEP. Within measurement frequency interval STEP the phase variation is $\Delta\phi = N2\pi$, where *N* may be in the order of 100–500 or more.

Figure 2:
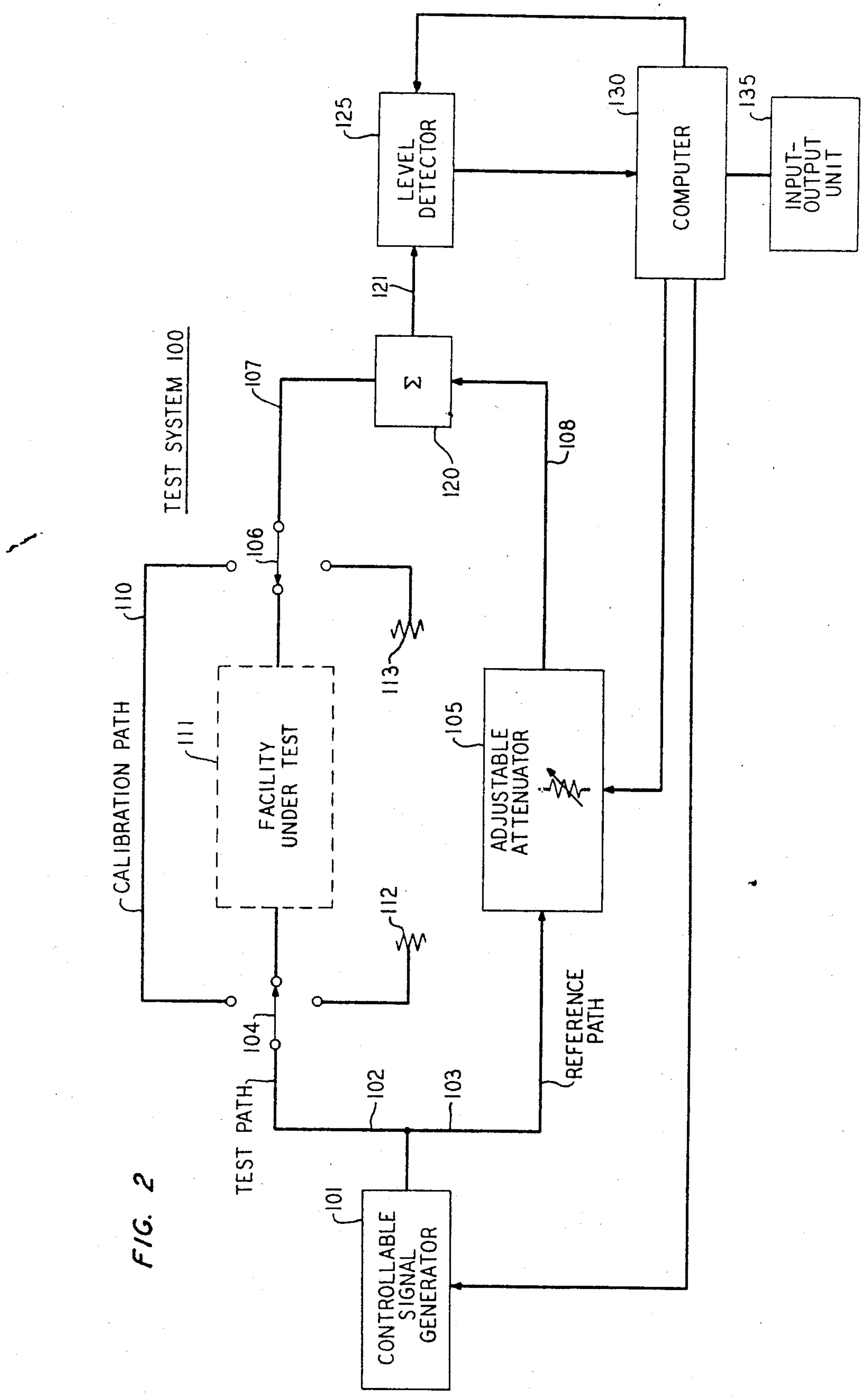
FIG. 2 shows, in block schematic form, an arrangement in accordance with the invention for obtaining envelope delay measurements.

FIG. 2 illustrates in simplified block diagram form test system 100 which utilizes a $2\pi$ null interval count technique in accordance with the invention to obtain a measure of envelope delay. This technique is commonly referred to as a $\pi$-point measurement technique.

Accordingly, controllable signal generator 101 is employed to supply test signals simultaneously at frequencies of interest to a test path and to a reference path. Specifically, signals are supplied from generator 101 via circuit path 102 to switch 104 and via circuit path 103 to adjustable attenuator 105. The reference path including attenuator 105 should have a substantially constant phase shift over the frequency range being considered.

Signal generator 101 may be any one of numerous controllable signal generators now well known in the art. Preferably, generator 101 is of a programmable type, which responds to control signals supplied by computer 130 for generating signals at desired frequencies and precise levels. One such programmable signal generator is disclosed in an article by N. H. Christiansen, entitled "New Instruments Simplify Carrier System Measurements," *Bell Laboratories Record*, September 1970, page 232.

Similarly, adjustable attenuator 105 may be any one of numerous controllable attenuators known in the art. Attenuator 105 also responds to control signals supplied by computer 130 to insert predetermined losses into the reference path as desired.

Switch 104 is utilized to connect either calibration path 110, facility-under-test 111, or termination element 122 in circuit with generator 101 via circuit path 102 as desired. Switch 106 is utilized to effect the connection of either calibration path 110, facility-under-test 111, or termination element 113 with one input of summing network 120 via circuit path 107. Similarly, the output of adjustable attenuator 105 is connected via circuit path 108 to a second input of summing network 120.

Summing network 120 yields a signal at 121 which represents the algebraic sum of the signals supplied from switch 106 and adjustable attenuator 105. In turn, the output from summing network 120 is supplied to level detector 125 where its amplitude level is determined.

Level detector 125 may also be any one of numerous controllable level detectors now well known in the art. Preferably, detector 125 is a programmable type capable of being remotely controlled by computer 130 to make a precise level measurement at frequencies of interest. One such level detector is also disclosed in the *Bell Laboratories Record* article cited above. Signals representative of the level measurements made by detector 125 are supplied to computer 130 where they are utilized to obtain a measure of envelope delay, envelope delay distortion and phase distortion of the facility-under-test.

Computer 130 is preprogrammed for generating signals for controlling signal generator 101, adjustable attenuator 105 and level detector 125, and for obtaining a measure of envelope delay, envelope delay distortion and phase distortion in accordance with the invention. Computer 130 may be any of the general purpose computers known in the art. Preferably, a Hewlett-Packard Model 2100 computer is employed as described in H-P reference manual No. 02100-90001 and H-P software operating procedures for H-P 2100 computer No. 5951-1371.

Input-output unit 135, which is, for example, a teletypewriter, is employed to access computer 130 and to obtain readouts as desired.

As stated above, the test technique employed in the practice of this invention yields a measure of envelope delay for a facility-under-test by counting the number of amplitude nulls in a predetermined measurement frequency interval. To this end, computer 130 is employed to generate signals for controlling attenuator 105 for adjusting the loss in the reference path to equal the loss experienced by the signal propagating through the facility-under-test at the frequency of interest. A null occurs when signals supplied to summing network 120 via circuit path 107 and, hence, facility-under-test 111, and via circuit path 108, and hence, attenuator 105, are equal and 180° out-of-phase. Computer 130 is also utilized to supply control signals to generator 101, causing the frequency of the test signals to be incremented over predetermined frequency intervals. The number of nulls, i.e., 2 $\pi$-points, occurring within a frequency interval is counted. Thereafter, Equation (1) is employed to compute the envelope delay over the particular frequency interval. This procedure is repeated for equal frequency intervals over the entire frequency band of the facility-under-test. The envelope delay values may be stored in the memory of computer 130 for later use, or they may be employed to obtain an indication of the envelope delay distortion and phase distortion characteristic for the facility-under-test.

Operation of computer 130 in controlling test system 100, in accordance with the invention, is described in the digital computer program listing shown in the appendix. This program listing written in FORTRAN II, is a description of the set of electrical control signals that serve to reconfigure computer 130 into a machine capable of controlling test system 100 for obtaining envelope delay measurements in accordance with the invention.

Figure 3:
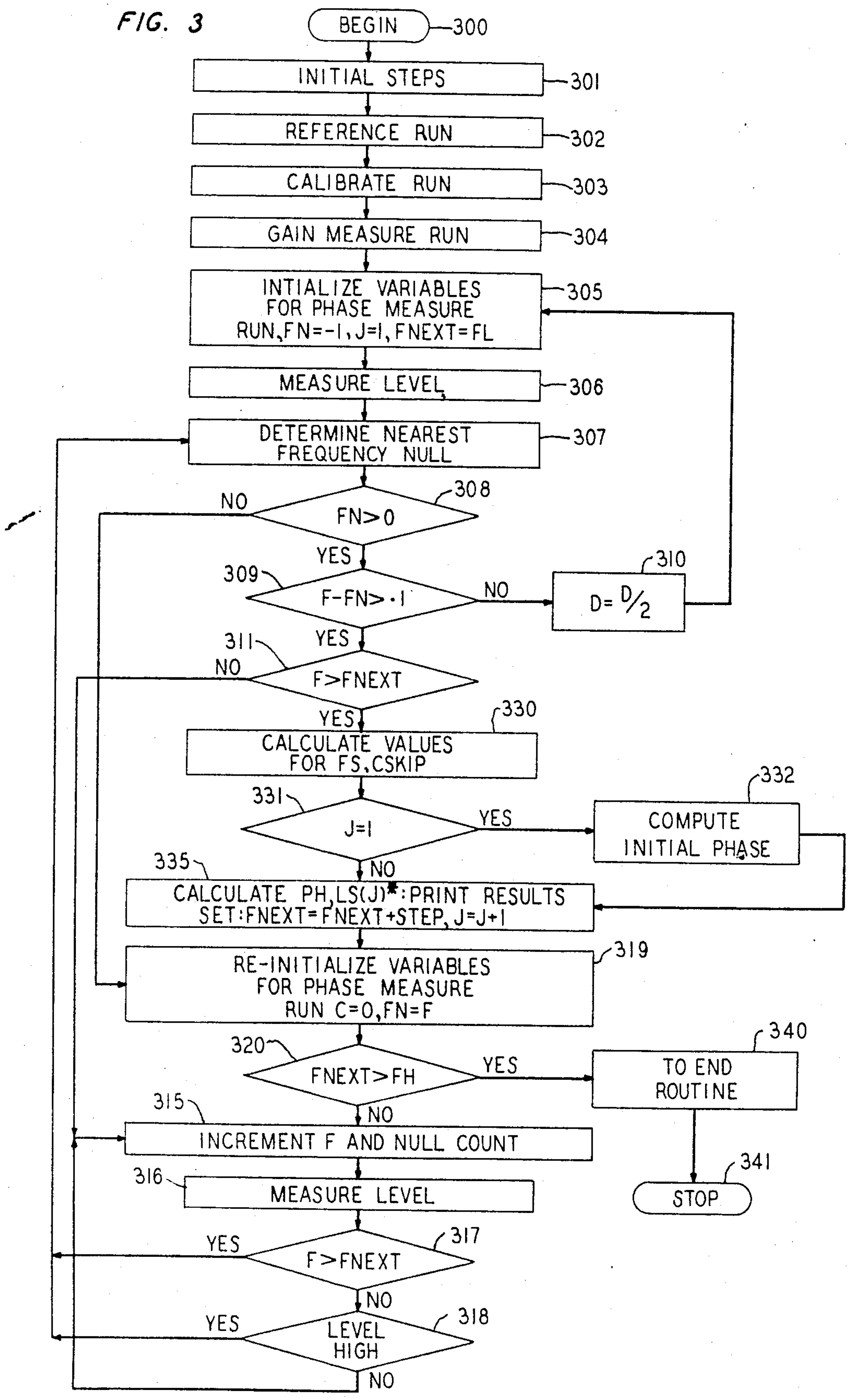
FIG. 3 is a flow chart which illustrates the sequence of steps in accordance with the invention for obtaining envelope delay measurements utilizing the system of FIG. 1.

The program listing and, hence, operation of test system 100, in accordance with the invention, is more readily understood with the aid of the flow chart shown in FIG. 3. The flow chart can be seen to include three different symbols. The oval symbols are terminal indicators and signify the beginning and end of the routine. The rectangles, commonly referred to as operation blocks, contain the description of a particular detailed operational step. The diamond-shaped symbols, commonly referred to as conditional branch points, contain a description of a test performed by the computer for enabling it to choose the next step to be performed.

In order to simplify and clarify the description of the invention, it is useful to define certain terms. Accordingly:

F — frequency in kilohertz;
FL — lowest frequency in measurement range in kilohertz;
FH — highest frequency in measurement range in kilohertz;
FS — frequency spacing between nulls;
FN — frequency at which a null occurs immediately above last test point at which test values are calculated;
DEL — small change in frequency;
J — index indicating measurement frequency;
FNEXT — next frequency at which measured values are to be determined;
LR(J) — array of level measurements associated with reference path 103 (FIG. 2);
LS(J) — array of level measurements associated with test path 102 connected to facility-under-test 111 (FIG. 2);
$L_1$, $L_2$ — levels measured for locating nulls;
CSKIP — number of nulls skipped per program cycle during phase measuring process;
STEP — measurement frequency increment at which gain and phase distortion are determined in kilohertz;
C — number of nulls counted
PH — phase distortion.

As shown in the flow chart of FIG. 3, the test system routine is entered at block 300. Operational block 301 indicates that computer 130 (FIG. 2) is to be initialized by supplying certain initial variables. This is achieved by an operator utilizing input unit 135 to supply values, for example, for the starting low frequency point *FL*, ending high frequency point *FH*, measurement frequency increment STEP, and the estimated loop length *D* in miles of the facility-under-test.

Operation block 302 (FIG. 3) indicates that a reference run is to be made. To this end, switches 104 and 106 (FIG. 2) connect terminating elements 112 and 113 to circuit paths 102 and 107, respectively. This ensures that only the reference path is being evaluated and that proper loading of generator 101 is maintained. Under control of computer 130, adjustable attenuator 105 is set to zero loss. Then, starting at frequency *FL*, the frequency of generator 101 is incremented by measurement frequency interval STEP until the upper frequency *FH* is reached. At each frequency, received level *LR*(*J*) is measured via detector 125 and stored in computer 130.

Block 303 (FIG. 3) indicates that a calibration run is to be made. Accordingly, adjustable attenuator 105 (FIG. 2) under control of computer 130 is set to its maximum value. This effectively provides terminations for circuit paths 103 and 108 substantially eliminating transmission via the reference path. Such terminations maintain proper loading of generator 101 and provide a proper termination for summing network 120. Switches 104 and 106 connect calibration path 110 into the test path including circuit paths 102 and 107. In practice, calibration path 110 is ordinarily a short length of cable. Again, the frequency of generator 101 is incremented by interval STEP from frequency *FL* to frequency *FH* and received signals *LS*(*J*) are measured at each frequency via detector 125 and stored in computer 130.

Operation block 304 (FIG. 3) indicates that a gain measure run is to be made. Therefore, switches 104 and 106 (FIG. 2) are set to connect facility-under-test 111 into the test path. Attenuator 105 remains at its maximum value. Then, a transmission gain measurement run is made, resulting in a measured received level *L*2 in dBm for each measurement frequency of interest from *FL* through *FH.* Computer 130 is utilized to compute the difference between the measured levels *L*2 and the measured levels *LR*(*J*) determined during the reference run at each frequency of interest. The resulting new values designated *LR*(*J*)* are also stored in the memory of computer 130.

It follows that if an attenuation value in dB equal to the value of *LR*(*J*)* is inserted into the reference path via adjustable attenuator 105, that the signal levels supplied to summing network 120 via the test path and the reference path should be equal. Accordingly, the attenuation value to be inserted under control of computer 130 into the reference path via attenuator 105 at each test frequency is expressed as $$LR(J)^* = L2 - LR(J). \tag{2}$$

Additionally, computer 130 is employed to compute the difference between received levels *LS*(*J*) measured during the calibration run and levels *L*2 measured above during the gain measurement run. The computed levels, designated *LS*(*J*)* are also stored in the memory of computer 130 and represent the system gain characteristic of facility-under-test 111. This system gain characteristic is expressed as $$LS(J)^* = L2 - LS(J). \tag{3}$$

Operational block 305 (FIG. 3) indicates that certain system variables are to be initialized for making a phase measurement run. To this end, an estimate of envelope delay of facility-under-test 111, expressed as *T*, is obtained from estimated loop distance *D* in miles of facility 111. In turn, this envelope delay estimate is employed in Equation (1) with $N=1$ to obtain an estimate of the frequency spacing between frequency nulls, namely, $FS = 1/T$, where $F = FS$. Additionally, a relatively small frequency change, for example, $DEL = FS/20$ is calculated for later use in a null search routine. The following initial values are also set: $FN = -1$, $J = 1$ and $FNEXT = FL$. These values merely indicate that a first frequency null is to be measured. $FNEXT = FL$ indicates that the first null being measured is at a frequency below $FL$ which, as stated above, is the lowest frequency of interest in testing facility-under-test 111.

The reason for measuring nulls below frequency $FL$ is to determine whether the initial estimate of null spacing $FS = 1/T$ is satisfactory. This initial null spacing value is evaluated by actually measuring a plurality of nulls at frequencies slightly below frequency $FL$. To this end, the frequency at which a first "trial" null measurement is made is set at a value somewhat below frequency $FL$, for example, at a frequency $F = FL - 5(FS)$. This should yield (5) nulls provided null spacing $FS$ was estimated reasonably accurately. Thus, a first null measurement is initiated under control of computer 130 (FIG. 2) by inserting attenuation value $LR(1)^*$ via adjustable attenuator 105 into the reference path. Since the loss of the facility-under-test does not vary significantly over a frequency interval, for example, over interval STEP (FIG. 1), the setting of attenuator 105 remains constant for each such measurement interval. $LR(1)$ was previously determined during the calibration run.

Operational block 306 (FIG. 3) indicates that a level measurement is made under the initial conditions. As stated above, insertion of attenuation value $LR(1)^*$ into the reference path (FIG. 2) should cause the signals supplied via the test path and the reference path to summing network 120 to be equal. Then, if the supplied signals are 180° out-of-phase, level detector 125 would indicate a null at the test frequency. In practice, however, the initial measurement generally does not yield a null and a level $L2$ is measured by level detector 125. A null search routine is employed to locate the exact null frequency as indicated by operational block 307 (FIG. 3). This alleviates the need for continuously adjusting the frequency of generator 101 in order to locate the nulls.

Figure 4:
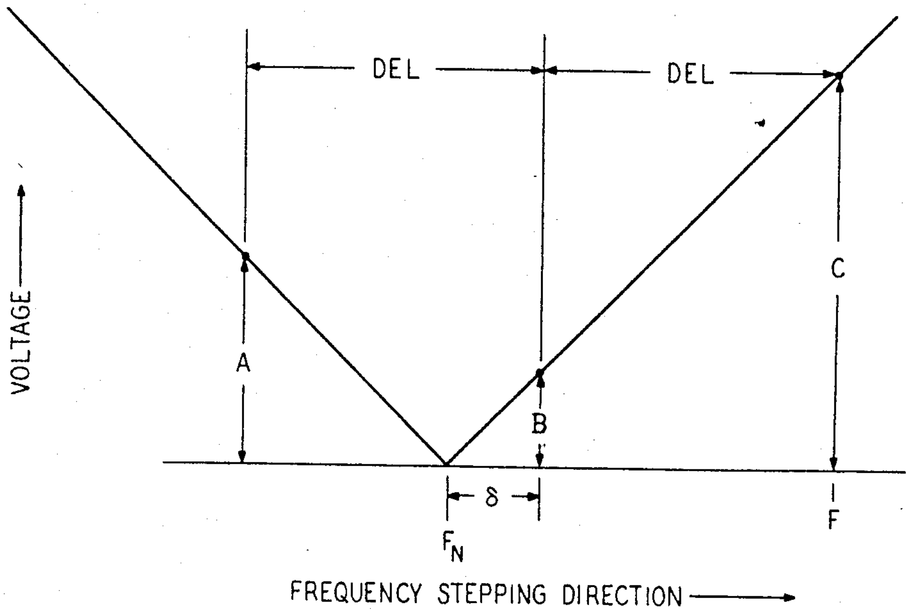
FIG. 4 shows a waveform useful in describing a routine utilized to determine null frequencies.

Referring to FIG. 4, there is shown in simplified graphical form a voltage versus frequency plot near a frequency null. As stated above, level $L2$ corresponding in voltage to amplitude A, was measured by level detector 125. For purposes of this example, it is assumed that amplitude A is located at a frequency somewhat below the null frequency being determined. Now the frequency of generator 101 (FIG. 2) is incremented under control of computer 130 to increase the frequency of generator 101 by an amount DEL (FIG. 4) and a level $L1$, corresponding to voltage amplitude $B$, is measured. If level $L1$ is less than level $L2$, the incremental frequency change was in a direction toward a null. In such an instance, $L2$ is set equal to $L1$ and the signal frequency is again incremented by DEL. A new measurement for $L1$ is obtained and the above process is iterated until $L1$ becomes greater than $L2$. This indicates that a null point has been passed. In this example, level $L1$ corresponding to voltage amplitude $C$ at frequency $F$, is greater than level $L2$ corresponding to voltage amplitude $B$ and, therefore, the null search routine is terminated.

On the other hand, if level $L1$ initially had been greater than level $l2$, the direction of incrementing the signal frequency is reversed. Then, the frequency is incremented by DEL to decrease the frequency of the signal supplied from generator 101 until level $L1$ first becomes less than $L2$ and, then, greater than $L2$. Again, this indicates that a null has been passed and the null search routine is terminated.

In either instance, it is readily seen from FIG. 4 that $$FN = F - (DEL + \delta), \tag{4}$$

where $$\delta = DEL\ (C - A/C + A). \tag{5}$$

Substituting Equation (5) for δ in equation (4) yields, $$FN = F - 2DEL/1 + A/C. \tag{6}$$

Since the level measurements are made in dBm, the difference between measurements is a ratio of voltages. Accordingly, it can be shown that $$A/C = 10^{(L1-L2)/20}. \tag{7}$$

Equation (7) is employed in computing null frequencies $FN$ of Equation (6). Since the null frequencies are readily determined by the above computations, the tedious task of detecting actual null frequencies is eliminated without loss of accuracy.

Returning now to FIG. 3, conditional branch point 308 evaluates frequency value $FN$ computed for the first measured null to determine if it is greater than zero. The condition of $FN$ being less than zero will be discussed below. If the computer value for frequency $FN$ is greater than zero, conditional branch point 308 passes control to conditional branch point 309.

Branch point 309 performs another evaluation of frequency $FN$ to determine if the original null spacing estimate, namely $FS = 1/T$, was satisfactory. If the original estimate was wrong, i.e., in error by greater than 50 percent, the null measurement routine will cycle continuously around the first value of frequency $FN$ and not step to the next null to be measured. This possibility of cycling is minimized by testing the value of frequency $FN$ to determine that the following criteria is met, $$F - FN < 0.1. \tag{8}$$

If the condition of Equation (8) is not satisfied, branch point 309 transfers control to operational block 310.

Block 310 changes the original estimate of the loop distance of the facility to a new value $D = D/2$. This ensures that the value of estimated delay $T$ of the facility under test is now within the 50 percent error limit. Thereafter, block 310 transfers control back to operational block 305 and the phase measure run is repeated as described above.

If the condition of Equation (8) is satisfied, a "good" first null has been measured and conditional branch point 309 transfers control to conditional branch point 311. In turn, branch point 311 tests frequency $F$ to determine if it is greater than FNEXT. Since this is still the first measure run, frequency $F$ is generally less than FNEXT and branch point 311 passes control to operational block 315.

Block 315 causes the frequency of generator 101 (FIG. 2) under control of computer 130 to be incremented by interval $FS$. Additionally, the last measured null is counted and the count is stored in computer 130 for later use. The output from summing network 120 at the new frequency is measured via level detector 125 as indicated in operational block 316. Control is then transferred to conditional branch point 317 where frequency $F$ is checked to determine whether it is greater than FNEXT. Again, since this is the first phase measure run, frequency $F$ is less than FNEXT and control is transferred to conditional branch point 318.

Branch point 318 evaluates the signal level at new measurement frequency $F$ to determine whether or not the frequency has been stepped to the vicinity of a null point. If the signal level is sufficiently "low" it is assumed that a null has been detected. It has been determined that the maximum allowable level for indicating that the level measurement is fairly close to a null is, $$LM < [LR(J)^* - \mathrm{LREF}], \tag{9}$$

where $LM$ is the measured level and LREF is a predetermined reference level. If the condition of Equation (9) is met, it can readily be shown that the phase of the signal being measured is within 60° of a true null point. Accordingly, if the level of the signal being measured is sufficiently low, the null is counted and the estimated null spacing interval $FS$ is employed again to increment the frequency. That is to say, if the measured level is not high, conditional branch point 318 (FIG. 3) returns control to operational block 315 and the frequency is incremented by interval $FS$ and another null is counted. This procedure is repeated, i.e., frequency $F$ is incremented by interval $FS$ and nulls are counted, until frequency $F$ becomes greater than FNEXT. In such an instance, conditional branch point 317 returns control to operational block 307 and the frequency of the last counted null is determined accurately via the null search routine described above.

Returning now to conditional branch point 318, had the condition of Equation (9) not been satisfied, i.e., measured level $LM$ high, conditional branch point 318 would have returned control to operational block 307 and the frequency of the nearest null would be determined. Thereafter, the process is continued, as described above until frequency $F$ becomes greater than FNEXT, in this example FNEXT = $FL$. Then, control is transferred via conditional branch point 317 to operational block 307 where the frequency of the last measured null is accurately determined.

Returning now to conditional branch point 308, had the initial computed value for frequency $FN$ been less than zero, branch point 308 would have transferred control to operational block 319. Such a condition, i.e., frequency $FN$ being less than zero, indicates an error, either in the selection of the first test frequency or in the null search routine. When such an error occurs it is corrected in operational block 319 by reinitializing the phase measure run variables. Once this has been accomplished, control is transferred via conditional branch point 320 to operational block 315.

Operational block 315 causes the frequency of generator 101 (FIG. 2) to be incremented by estimated null spacing $FS$. Then, control is transferred to operational block 316 and the signal level output of summing network 120 (FIG. 2) is measured via level detector 125. Thereafter, control is transferred via conditional branch point 317 to conditional branch point 318.

Branch point 318 evaluates the measured level to determine if the condition of Equation (9) is met, namely, is the measured level low enough to indicate that a null has been detected. If the condition of Equation (9) is met, a null has been detected and branch point 318 returns control to operational block 315. The frequency of generator 101 (FIG. 2) is again incremented by value $FS$ and the detected null is counted and stored in the memory of computer 130. This process is repeated until the signal frequency becomes greater than FNEXT or the measured signal level is such that the condition of Equation (9) is not met, namely, $LM$ being too high. In either instance, control is passed via branch point 317 or 318 to operational block 307 where the nearest null frequency is accurately determined via the null search routine discussed above. When frequency $F$ is greater than FNEXT, operational block 307 transfers control via conditional branch points 308, 309 and 311 to operational block 330.

At this time, computer 130 (FIG. 2) has in memory the frequency of the first measured null $FN$, the frequency of the last measured null $F$ and the number of nulls counted $C$. Accordingly, envelope delay $\tau$ for frequency interval F-FN is calculated by utilizing:

$$\tau = C/F-FN. \tag{10}$$

In turn, the results of Equation (10) are employed to determine a more exact value of null spacing $FS$, for the next frequency interval in which nulls are to be counted, namely, $$FS = 1/\tau \tag{11}$$

As noted above, each and every null was "tested" during initial frequency interval $F-FN$. That is to say, the routine stepped from null-to-null. Such a procedure is rather burdensome when considering that there are as many as 500 nulls per measurement frequency interval.

From practice, it has been determined that the rate-of-change of envelope delay is not large. Furthermore, since an updated estimate, in accordance with the invention, of the envelope delay has resulted from the measurements made during the initial test interval, it is possible to count a plurality of frequency nulls during each cycle of the phase measurement routine without compromising measurement accuracy. Consider the following example, assume that the frequency spacing between nulls is 2 KHz and, further, that the measurement STEP is 1 MHz, that is, there are 500 nulls in the measurement interval. Rather than step from null-to-null, the routine is arranged, in accordance with the invention, to measure nulls only at predetermined measurement intervals per measurement interval STEP. In one example from practice only 20 actual null measurements are made in interval STEP = 1 MHz. Thus, 25 nulls are skipped during each measurement cycle, thereby substantially reducing the number of actual null measurements made over the entire frequency band of the facility-under-test.

The number of nulls to be measured during each cycle of the program, in accordance with the invention, is computed by $$CSKIP = (STEP/21 \cdot FS) + 1, \tag{12}$$

where 21 is arbitrarily chosen to insure that 20 measurements are made per frequency interval STEP. Equation (12) also insures that CSKIP is at least one. Accordingly, operational block 330 employs Equations (11) and (12) to compute values for null spacing *FS* and number of nulls skipped CSKIP, respectively.

Thereafter, control is transferred to conditional branch point 331 which determines whether or not the initial measurement run has been made. Since this is still the initial measurement run, branch point 331 transfers control to operational block 332, and the initial phase of facility-under-test 111 (FIG. 2) at frequency *FL* is computed by $$\theta_i = 180 + 360(FL-F)/FS, \tag{13}$$

where $\theta_i$ is the initial phase value. The computed value of initial phase is stored in computer 130 for use later.

Control is transferred to operational block 335 where new values for FNEXT and *J* are set for the next phase measurement run, namely, FNEXT equals FNEXT + STEP and $J=J+1$. Since the initial phase run has been completed, FNEXT is $FL + STEP = F1$ (FIG. 1) while *J* still is $J = 1$. Thereafter, control is transferred to operational block 319 which reinitializes variables for the next phase measurement run. To this end, null count *C* is set to zero and the first null frequency *FN* is set to be equal to the last measured null frequency *F*. Since $J = 1$, attenuator 105 need not be readjusted at this time because the attenuation inserted into reference path 103 is still $LR(1)^*$. Once all the variables have been initialized, control is transferred via branch point 320 to operational block 315.

Operational block 315 causes the frequency of generator 101 (FIG. 2) to be incremented by intervals equal to $$F = F + [CSKIP \cdot FS] \tag{14}$$

and the estimated number of nulls is counted and stored in the memory of computer 130. Thereafter, the phase measuring cycle progresses until frequency *F* becomes greater than FNEXT, as discussed above for the initial phase measure run and will not be discussed again in detail.

Once frequency *F* becomes greater than FNEXT, conditional branch point 317 again transfers control to operational block 307 and the frequency of the nearest null is determined. Then, control is transferred via conditional branch points 308, 309, and 311 to operational block 330. Block 330 causes new values for *FS* and CSKIP to be calculated by employing Equations (11) and (12), respectively. Thereafter, control is transferred via conditional branch point 331 to operational block 335.

Block 335 causes values for phase distortion *PH* and system gain characteristic $L(S)^*$ to be calculated and then printed out on input/output unit 135 (FIG. 2). The phase distortion experienced over measurement frequency interval STEP is defined as $$PH = 360 \cdot STEP\ [(1/FS) - T] \tag{15}$$

where *T* is an estimate of the envelope delay for the facility-under-test. Phase distortion *PH* determined for each measurement frequency interval STEP when added to previously accumulated phase distortion *PH* (J-1) for the preceding (J-1) intervals STEP yields the total measured phase distortion for the facility over frequency interval FJ–FL. A general formula for total phase distortion is $$PH(J) = 360 \cdot STEP \cdot [(1/FS) - T] + PH(J-1). \tag{16}$$

Thereafter, the phase measuring routine is repeated for each succeeding measurement interval STEP until frequency FNEXT becomes greater than *FH* (the highest frequency of interest for facility-under-test 111). Then conditional branch point 320 transfers control to operational block 340.

Block 340 causes the phase measuring routine to terminate and the last calculated values for phase distortion *PH* and system gain characteristic $L(S)^*$ are printed out via input/output unit 135.

Additionally, a value for the average envelope delay $\tau A$ of facility-under-test 111 is calculated as follows:

$$\tau A = T + PH(J)/360 \cdot (FH-FL). \tag{17}$$

The computer value of average envelope delay is also printed out on input/output unit 135. Then, block 341 terminates the test routine.

The calculated average envelope delay value may be employed as a new estimate of the envelope delay of facility-under-test 111 for re-running the phase measurement routine. This should, in general, result in a smaller peak deviation.

APPENDIX

```
FTN,B
      PROGRAM PIPNT
      DIMENSION LR(4ØØ),LS(4ØØ)
8Ø    IF(ISSW(1)) 12Ø,9Ø
C
C-----INITIAL STEPS---------------------
C
```

```
   9Ø WRITE(2,1)
    1 FORMAT(//"CABLE LOSS & PHASE DISTORTION MEASUREMENTS")
      WRITE (2,2)
2     FORMAT(/"        TIME & DATE: ♡ ")
      READ(1,3) XXX
    3 FORMAT(A2)
      WRITE(2,5)
5     FORMAT("FREQ RANGE(KHZ); LOW,HIGH,STEP: ♡ ")
      READ(1,*) FL,FH,STEP
      WRITE(2,6)
      FORMAT("EST. LOOPED TRANSM, SYSTEM LENGTH (MI,): ♡ ")
      READ(1,*)D
      D=D*5.5/1ØØØ.
      FH=FH+,ØØ1
      LB=-5ØØ
C
C-----REFERENCE RUN----------------------
C
1ØØ   WRITE(2,9)
9     FORMAT(/"TERMINATE SYSTEM PORTS.  ♡ ")
      PAUSE
      F=FL
      J=1
1Ø1   LR(J)=L9ØB(F,Ø,LB)
      LREF=LR(J)
      J=J+1
      F=F+STEP
      IF(F-FH) 1Ø1,1Ø2
C
C-----CALIBRATE RUN----------------------
C
1Ø2   WRITE(2,1Ø)
1Ø    FORMAT("CONNECT CALIBRATE PATH.  ♡ ")
      PAUSE
      F=FL
      J=1
1Ø3   LS(J)=L9Ø8(F,-99ØØ,LB)
      J=J+1
      F=F+STEP
      IF(F-FH) 1Ø3,1Ø4
C
C-----GAIN MEASURE RUN----------------------
C
1Ø4   WRITE(2,11)
11    FORMAT("CONNECT TO SYSTEM.  ♡ ")
      PAUSE
      F=FL
      J=1
1Ø5   L2=L9ØB(F,-99ØØ,LB)
      LR(J)=L2-LR(J)
      LS(J)=L2-LS(J)
      J=J+1
      F=F+STEP
      IF(F-FH) 1Ø5,12Ø
  12Ø CONTINUE
```

```
C
C-----PHASE MEASURING PROCEDURE-INITIAL STEPS--
C
      WRITE(2,21)
   21 FORMAT(/"FREQ(KHZ)   GAIN   PHASE DISTORTIØN")
      WRITE(2,22)
   22 FORMAT(7"-----")
      FNEXT=FL
      FS=1./D
      F=FL-5.*FS
      FN=-1.
      PH=Ø.
      J=1
      CSKIP=1.
C
C-----DETERMINE NEAREST NULL FREQ.-------------
C
      L1=L9ØB(F,I,R(J),LB)
21Ø   DEL=FS/2Ø.
      L2=1
211   F=F+DEL
      L3=L2
      L2=L1
      L1=L9ØB(F,LR(J),LB)
      IF(L1-L2) 211,221
221   DEL=-DEL
      IF(L3) 225,211
  225 V2=1Ø.**(FLOAT(L3-L1)/2ØØØ.)
      F=F+2.*DEL/(1.+V2)
      IF(FN) 239,226
226   IF(F-FN-.1) 227,229
227   D=D/2.
      GO TO 22
C
C-----HAS NEXT MEAS. FREQ. BEEN REACHED?-------
C
229   IF(F-FNEXT) 24Ø,23Ø
  23Ø FS=(F-FN)/C
      CSKIP=FLOAT(IFIX(STEP/(21.*FS)))+1.
C
C-----CALC.PHASE DIST.--PRINT RESULTS----------
C
      PH=(1./FS-D)*STEP*36Ø.+PH
      IF(J-2) 231,235
231   PHASE=18Ø.+(FL-F)/FS*36Ø.
      PH=Ø.
  235 V1=FLOAT(LS(J))/1ØØ.
      WRITE(2,23) FNEXT,V1,PH
223   FORMAT(F8.Ø,F8.2,4X,F9.2)
      IF(ISSW(13))236,237
2236  WRITE(2,24)F,FS
234   FORMAT(25X, F9.2,F8.4)
2237  IF(ISSW(15)) 3ØØ,238
2238  FNEXT=FNEXT+STEP
      J=J+1
```

```
2239  C=Ø.
      FN=F
      IF(FNEXT-FH)24Ø,3ØØ
CC
CC----INCREMENT FREQUENCY--COUNT NULLS---------
CC
224Ø  C=C+CSKIP
      F=F+CSKIP*FS
      L1=L9ØB(F,LR(J),LB)
      IF(F-FNEXT) 245,21Ø
245   IF(L1-LR(J)-LREF)24Ø,21Ø
C
C-----END ROUTINE----
C
3ØØ   D=D+PH/(F-FL)/36Ø.
      WRITE(2,31)D
31    FORMAT(/"AVG. DELAY=",F8.3," MILLISECONDS")
      WRITE(2,32) PHASE,FL
32    FORMAT("PHASE=",F6.1," AT",F8.Ø," KHZ")
      PAUSE
      GO TO 8Ø
      END
      ENDS
```

What is claimed is:

1. Apparatus for obtaining a measure of envelope delay of a transmission facility which comprises:

- a test circuit path having an input and an output, said test circuit path including means for accommodating a facility to be evaluated;
- a reference circuit path having an input and an output;
- controllable signal generator means for supplying a test signal at test frequencies simultaneously to the input of said test path and said reference path;
- controllable attenuator means connected in said reference path for inserting a loss into said reference path substantially equal to the loss experienced by said test signal in a facility being evaluated at said test frequencies;
- summing means having an input and an output, said input being in circuit with the outputs of said test and reference paths for algebraically summing signals propagated through said test and reference paths;
- means for obtaining a measure of the signal level of a signal developed at the output of said algebraic summing means; and
- control means for generating signals to control said signal generator means, said attenuator means and said level measuring means, wherein said signal generator means is responsive to selected ones of said control signals selectively to step the frequency of said test signal at a first frequency increment through a predetermined measurement frequency interval and wherein said measured signal level values at said first frequency increments are supplied to said control means to obtain a count of the number of amplitude nulls occurring within said measurement frequency interval, said null count and said measurement frequency interval being utilized to obtain a measure of envelope delay over the measurement frequency interval.

2. The invention as defined in claim 1 wherein said control means generates signals in response to the number of nulls counted over a substantially predetermined frequency interval for controlling said signal generator means to step the frequency of said test signal at a second frequency increment over said measurement frequency interval, said second frequency increment being substantially equal to the frequency spacing between nulls multipled by a predetermined number of nulls.

3. The invention as defined in claim 1 wherein said attenuator means in response to selected others of said control signals inserts a loss having a predetermined value into said reference path for each of said measurement frequency intervals.

4. The invention as defined in claim 1 wherein said control signal means in response to said null count over said measurement frequency interval generates indications representative of the envelope delay of the facility being evaluated over said measurement frequency interval in accordance with $$\tau = N/\Delta F,$$

where $\tau$ is the envelope delay, $\Delta F$ is the measurement frequency interval and $N$ is the number of nulls counted in interval $\Delta F$.

5. The invention as defined in claim 1 wherein said control means generates signals in response to the number of nulls counted in the last previous measurement frequency interval for controlling said signal generator means to step the test signal frequency over the next subsequent frequency interval at frequency increments substantially equal to the frequency spacing between nulls in the last previous measurement frequency interval multiplied by a predetermined number of nulls to be skipped.

6. The invention as defined in claim 1 wherein said control means includes means for generating signals to control said signal generator means, said attenuator means and said level measuring means for determining the number of amplitude nulls which occur in a predetermined initial measurement frequency interval, and means for calculating the frequency spacing between said nulls in said initial interval to determine said first frequency increment.

7. The invention as defined in claim 6 wherein said control means further includes means for utilizing the number of nulls occurring in the last previous measurement frequency interval to obtain an updated value of frequency spacing between nulls for the next measurement frequency interval, means for employing said updated value of frequency spacing between nulls to calculate an updated frequency increment, said updated frequency increment being equal to said updated frequency spacing between nulls multiplied by a number of nulls to be skipped, means for generating signals to control said signal generator means for stepping the frequency of said test signal by said updated frequency increment, and means for evaluating the output of said level measuring means to determine that its amplitude is substantially at an amplitude null at said test signal frequency.

8. The invention as defined in claim 7 wherein the means for obtaining the updated frequency spacing includes means for determining the exact frequency of the last null occurring in said last previous measurement interval, means for obtaining the difference in frequency between the last null in said last previous measurement interval and the last null in the second last previous measurement interval, and means for dividing said difference interval by the number of nulls counted in said last previous measurement frequency interval.

9. The invention as defined in claim 8 wherein said means for determining the exact frequency of an amplitude null includes storage means in circuit relationship with said level measuring means for storing measured amplitude values, comparator means for comparing predetermined ones of the stored amplitude values, substitution means for selectively substituting ones of said stored amplitude values for others of said stored amplitude values being compared, means for generating a sequence of control signals to control said signal generator means and said level measuring means to measure the output from said summing means at test frequencies determined in accordance with a pre-established criterion to obtain amplitude values in accordance with a predetermined relationship of the amplitudes measured at said test frequencies, and means for utilizing the amplitude values of said predetermined relationship of measured amplitudes to compute the exact frequency of said amplitude null.

10. The invention as defined in claim 9 wherein said control signal generating means generates a sequence of control signals which are employed to control said signal generator means, said level measuring means, said storage means, said comparing means and said substituting means to obtain an exact frequency of an amplitude null by:

first, controlling said signal generator means to generate a test signal at a first test signal frequency;

second, controlling said level measuring means to measure the amplitude of the output from said summing means at said first test signal frequency;

third, storing a first signal representative of said measured amplitude at said first frequency;

fourth, controlling said signal generator to step said test signal frequency by a predetermined increment to adjust the frequency of said test signal in accordance with a pre-established criterion to generate a test signal at a second test signal frequency;

fifth, controlling said level measuring means to measure the amplitude of the output from said summing means at said second test signal frequency;

sixth, storing a second signal representative of said measured amplitude at said second frequency;

seventh, comparing said first and second stored signals;

eighth, controlling said signal generator means to step said test signal frequency by said predetermined increment to adjust the frequency of said test signal in accordance with a pre-established criterion based on the comparison of said first and second stored signal amplitudes to obtain a third test signal frequency;

ninth, controlling said level measuring means to measure the amplitude of the output from said summing means at said third test signal frequency;

tenth, storing a third signal representative of said measured amplitude at said third frequency;

eleventh, selectively substituting the second signal amplitude for the first signal amplitude, and selectively substituting the third signal amplitude for the second signal amplitude;

twelfth, repeating the seventh, eighth, ninth, 10th, and 11th steps until a predetermined relationship is obtained among the amplitude measurements at frequencies above and below the null being detected;

utilizing the amplitude values of said predetermined relationship of amplitude measurements to determine the exact frequency of the null being detected.

11. A method for obtaining a measure of envelope delay of an electrically long transmission facility comprising the steps of:

generating a test signal at a test frequency;

supplying said test signal simultaneously to a reference path and to a test path including a facility under test;

adjusting the loss in said reference path to be substantially equal to the loss experienced by said test signal at said test frequency in said facility;

algebraically combining signals propagated through said test path and said reference path;

stepping the frequency of said test signal by a first predetermined frequency increment over a predetermined measurement frequency interval;

evaluating the resultant algebraically combined signal at each of said frequency increments to determine the number of amplitude nulls which occur in said measurement frequency interval; and utilizing said number of nulls in conjunction with said measurement interval to obtain a measure of envelope delay for the facility-under-test for said measurement frequency interval.

12. The method as defined in claim 11 wherein said first predetermined frequency increment is determined by the steps of, determining the number of amplitude nulls which occur in a predetermined initial measurement frequency interval, and calculating the frequency spacing between said nulls in said initial interval to determine said first frequency increment.

13. The method as defined in claim 12 wherein the step of determining the number of amplitude nulls in said initial frequency interval includes the steps of:

first, generating a test signal at a first test signal frequency;

second, measuring the amplitude of said resultant algebraically combined signal at said first test signal frequency;

third, stepping said test signal frequency by a predetermined increment to adjust the frequency of said test signal in accordance with a pre-established criterion to generate a test signal at a second test signal frequency;

fourth, measuring the amplitude of said resultant algebraically combined signal at said second test signal frequency;

fifth, comparing the measured amplitudes at said first and second test signal frequencies;

sixth, stepping said test signal frequency by said predetermined increment to adjust the frequency of said test signal in accordance with a pre-established criterion based on the comparison of said test signal amplitudes to obtain a third test signal frequency;

seventh, measuring the amplitude of the resultant algebraically combined signal at said third test signal frequency;

eighth, selectively substituting the signal amplitude at said second test frequency for the signal amplitude at said first test frequency, and selectively substituting the signal amplitude at said third test frequency for the signal at said second test frequency;

ninth repeating the fifth, sixth, seventh and eighth steps until a predetermined relationship is obtained among the amplitude measurements at frequencies above and below the null being detected; and utilizing the amplitude values of said predetermined relationship of amplitude measurements to determine the exact frequency of the null being detected.

14. The method as defined in claim 12 whereupon the number of nulls in said measurement frequency interval has been determined by stepping said test signal by said first frequency increment, a second frequency increment for stepping said test signal over a second measurement frequency interval is determined by the steps of, utilizing the initial frequency spacing between nulls to determine a second frequency increment, said second frequency increment being equal to said initial frequency spacing between nulls multiplied by a predetermined number of nulls, and stepping the frequency of said test signal by said second frequency increment over a predetermined measurement frequency interval.

15. The method as defined in claim 14 whereupon the number of nulls in said second measurement frequency interval has been determined, the frequency increment for stepping said test signal over subsequent measurement frequency intervals is determined by the steps of:

utilizing the number of nulls occurring in the last previous measurement frequency interval to obtain an updated value of frequency spacing between nulls for the next measurement frequency interval;

employing said updated value of frequency spacing between nulls to calculate an updated frequency increment, said updated frequency increment being equal to said updated frequency spacing between nulls multiplied by a number of nulls to be skipped;

stepping the frequency of said test signal by said updated frequency increment; and evaluating said resultant algebraically combined signal to determine that its amplitude is substantially at an amplitude null at said test signal frequency.

16. The method as defined in claim 15 wherein the updated frequency spacing between nulls is determined by the steps of:

determining the exact frequency of the last null occurring in said last previous measurement interval;

obtaining the difference in frequency between the last null in said last previous measurement interval and the last null in the second last previous measurement interval; and dividing said difference interval by the number of nulls counted in said last previous measurement frequency interval.

17. The method as defined in claim 16 wherein the exact frequency of an amplitude null is determined by the steps of:

first, measuring the amplitude of the resultant algebraically combined signal at a first test signal frequency, said first test signal frequency being the signal frequency at the last increment in said last previous measurement interval;

second, stepping said test signal frequency by a predetermined increment to adjust the frequency of said test signal in accordance with a pre-established criterion to generate a test signal at a second test signal frequency;

third, measuring the amplitude of the resultant algebraically combined signal at said second test signal frequency;

fourth, comparing the measured amplitudes at said first and second test signal frequencies;

fifth, stepping said test signal frequency by said predetermined increment to adjust the frequency of said test signal in accordance with a pre-established criterion based on the comparison of said test signal amplitudes to obtain a third test signal frequency;

sixth, measuring the amplitude of the resultant algebraically combined signal at said third test signal frequency;

seventh, selectively substituting the signal amplitude at said second test frequency for the signal amplitude at said first test frequency and selectively substituting the signal amplitude at said third test frequency for the signal amplitude at said second test frequency;

eighth, repeating the fourth, fifth, sixth and seventh steps until a predetermined relationship is obtained among the amplitude measurements at frequencies above and below the null being detected; and utilizing the amplitude values of said predetermined relationship of amplitude measurements to determine the exact frequency of the null being detected.

18. A method for obtaining a measure of envelope delay of an electrically long transmission facility comprising the steps of:

adjusting the loss inserted into a reference path to be substantially zero, generating a test signal at a test frequency, supplying said test signal to said reference path, stepping the frequency of said test signal by a predetermined measurement interval beginning at a predetermined starting frequency and ending at a predetermined termination frequency, measuring the level of the signal propagated through said reference path at each of said measurement frequency steps, said measurements being designated reference level measurements, and storing said reference level measurements;

connecting a facility-under-test in a test circuit path, generating a test signal at a test frequency, supplying said test signal to said test path including said facility-under-test, stepping the frequency of said test signal by said predetermined measurement interval beginning at said starting frequency and ending at said termination frequency, measuring the level of the signal propagated through said test path and said facility-under-test at each of said frequency steps, said level measurements being designated gain level measurements, and storing said gain level measurements;

subtracting said reference level from said gain level for each of said measurement frequency steps to obtain a value of attenuation to be inserted into said reference path at each of said measurement frequency intervals;

generating a test signal at a test frequency;

inserting a loss into said reference path equal to the value computed for the measurement frequency interval of said test signal;

supplying said test signal simultaneously to said reference path and to said test path including said facility-under-test;

algebraically combining signals propagated through said test path and said reference path;

stepping the frequency of said test signal by a predetermined first frequency increment over each of said measurement frequency intervals;

evaluating the resultant algebraically combined signal at each of said first frequency increments to determine the number of amplitude nulls which occur in each of said measurement frequency intervals; and utilizing said number of nulls occurring in each of said measurement intervals in conjunction with the measurement interval to obtain a measurement of envelope delay for the facility-under-test for each of said measurement frequency intervals.

19. The method as defined in claim 18 wherein said predetermined first frequency increment is determined by the steps of, determining the number of amplitude nulls which occur in a predetermined initial measurement frequency interval, and calculating the frequency spacing between said nulls in said initial interval to determine said first frequency increment.

20. The method as defined in claim 19 whereupon the number of nulls in said measurement frequency interval has been determined by stepping said test signal by said first frequency increment, a second frequency increment for stepping said test signal over a second measurement frequency interval is determined by the steps of, utilizing the initial frequency spacing between nulls to determine a second frequency increment, said second frequency increment being equal to said initial frequency spacing between nulls multiplied by a predetermined number of nulls, and stepping the frequency of said test signal by said second frequency increment over said predetermined measurement frequency intervals.

21. The method as defined in claim 20 whereupon the number of nulls in said second measurement frequency interval has been determined, the frequency increment for stepping said test signal over subsequent measurement frequency intervals is determined by the steps of, utilizing the number of nulls occurring in the last previous measurement frequency interval to obtain an updated value of frequency spacing between nulls for the next measurement frequency interval, employing said updated value of frequency spacing between nulls to calculate an updated frequency increment, said updated frequency increment being equal to said updated frequency spacing between nulls multiplied by a number of nulls to be skipped, stepping the frequency of said test signal by said updated frequency increment, and evaluating said algebraically combined signal to determine that its amplitude is substantially at an amplitude null at said test signal frequency.

22. The method as defined in claim 21 wherein the updated frequency spacing between nulls is determined by the steps of, determining the exact frequency of the last null occurring in said last previous measurement interval, obtaining the difference in frequency between the last null in said last previous measurement interval and the last null in the second last previous measurement interval, and dividing said difference interval by the number of nulls counted in said last previous measurement frequency interval.

23. The method as defined in claim 22 wherein the exact frequency of an amplitude null is determined by the steps of:

first, measuring the amplitude of said resultant algebraically combined signal at a first test signal frequency, said first test signal frequency being substantially the signal frequency at the last increment in said last previous measurement interval;

second, stepping said test signal frequency by a predetermined increment to adjust the frequency of said test signal in accordance with a pre-established criterion to generate a test signal at a second test signal frequency;

third, measuring the amplitude of said resultant algebraically combined signal at said second test signal frequency;

fourth, comparing the measured amplitudes at said first and second test signal frequencies;

fifth, stepping said test signal frequency by said predetermined increment to adjust the frequency of said test signal in accordance with a pre-established criterion based on the comparison of said test signal amplitudes to obtain a third test signal frequency;

sixth, measuring the amplitude of said resultant algebraically combined signal at said third test signal frequency;

seventh, selectively substituting the signal amplitude at said second test frequency for the signal amplitude at said first test frequency and selectively substituting the signal amplitude at said third test frequency for the signal amplitude at said second test frequency;

eighth, repeating the fourth, fifth, sixth and seventh steps until a predetermined relationship is obtained among the amplitude measurements at frequencies above and below the null being detected; and utilizing the amplitude values of said predetermined relationship of amplitude measurements to determine the exact frequency of the null being detected.

* * * * *